(12) United States Patent
Neumann (10) Patent No.: US 9,877,437 B2
(45) Date of Patent: Jan. 30, 2018

(54) FELLED TREE LEAN CONTROL SYSTEM AND METHOD

(71) Applicant: Deere & Company, Moline, IL (US)

(72) Inventor: Bryon P. Neumann, Brantford (CA)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/282,201

(22) Filed: Sep. 30, 2016

(65) Prior Publication Data

US 2017/0086395 A1 Mar. 30, 2017

Related U.S. Application Data

(60) Provisional application No. 62/235,492, filed on Sep. 30, 2015.

(51) Int. Cl.
*A01G 23/081* (2006.01)
*G01L 1/02* (2006.01)

(52) U.S. Cl.
CPC .............. *A01G 23/081* (2013.01); *G01L 1/02* (2013.01)

(58) Field of Classification Search
CPC ................................ A01G 23/081; G01L 1/02
USPC ........................................................ 701/50
See application file for complete search history.

(56) References Cited

U.S. PATENT DOCUMENTS

| | | | | |
|---|---|---|---|---|
| 3,630,246 A * | 12/1971 | Hamilton | ............... | A01G 23/08 144/34.1 |
| 3,659,635 A * | 5/1972 | Mellgren | ............... | A01G 23/08 144/4.1 |
| 4,039,009 A * | 8/1977 | Lindblom | ............... | A01G 23/08 137/87.01 |
| 4,108,224 A * | 8/1978 | Wirt | ...................... | A01G 23/089 144/34.5 |
| 4,131,145 A * | 12/1978 | Puna | .................... | A01G 23/089 144/34.1 |
| 5,161,588 A * | 11/1992 | Hamilton | ............. | A01G 23/081 144/339 |
| 5,377,730 A * | 1/1995 | Hamilton | ............. | A01G 23/081 144/335 |
| 5,628,354 A * | 5/1997 | Kingston | ............. | A01G 23/097 144/24.13 |
| 6,182,725 B1 * | 2/2001 | Sorvik | .................. | A01G 23/08 144/335 |
| 8,430,621 B2 * | 4/2013 | Jantti | ...................... | E02F 3/436 414/699 |
| 9,155,253 B2 * | 10/2015 | Arvidsson | ............ | A01G 23/099 |
| 2016/0309666 A1 * | 10/2016 | Schierschmidt | ....... | A01G 23/08 |

* cited by examiner

*Primary Examiner* — Tyler J Lee
(74) *Attorney, Agent, or Firm* — Michael Best & Friedrich LLP (57) ABSTRACT

A controlled lean system for a tree feller-buncher includes a sensor configured to measure an orientation of a boom coupled to the tree feller-buncher, and a felling head operably connected to the boom. A controller is operable to detect a cut tree carried by the felling head and to estimate a quantity of tree lean needed to reduce torsional load during rotation of the boom while carrying the cut tree based at least in part on the measured orientation of the boom.

25 Claims, 4 Drawing Sheets

FELLED TREE LEAN CONTROL SYSTEM AND METHOD

CROSS-REFERENCE TO RELATED APPLICATIONS

This application claims priority to U.S. Provisional Patent Application No. 62/235,492, filed on Sep. 30, 2015, and entitled Felled Tree Lean Control System and Method, the entire content of which is hereby incorporated by reference in its entirety.

BACKGROUND

The present disclosure relates to systems and methods for felling trees, in particular with a forestry vehicle. More specifically, the present disclosure relates to a control system for a tree feller-buncher that leans a felled tree in a controlled manner.

Tree felling is the process of downing individual trees. Tree felling can be performed by hand (i.e., using an axe, saw, chainsaw, or other handheld device) or with mechanical assistance (i.e., using one or more pieces of logging equipment). A tree feller-buncher is a motorized mechanical felling vehicle that carries an attachment that cuts and gathers one or more trees during the process of tree felling. During operation, after the tree feller-buncher engages a tree and cuts it down using the attachment, the tree feller-buncher may move the cut tree. When movement includes rotation of the tree feller-buncher while continuing to engage the cut tree, the attachment can incur a high torsional load from a high center of gravity of the tree being moved (or accelerated). To withstand the high torsional load and minimize a structural failure, a more robust and heavy attachment is often used. However, when the weight of the attachment is increased, additional counterweight must be added to balance the tree feller-buncher. The additional weight of the attachment and counterweight increases the total weight of the tree feller-buncher. Also, a higher weight tree feller-buncher increases ground pressure, increases a risk for environmental disturbance, and requires larger drive motors to operate (e.g., track drive, etc.).

SUMMARY

In one aspect, the disclosure provides a controlled lean system for a tree feller-buncher. The system includes a first sensor configured to measure an orientation of a boom coupled to the tree feller-buncher, and a felling head operably connected to the boom. A controller is operable to detect a cut tree carried by the felling head and to estimate a quantity of tree lean needed to reduce torsional load during rotation of the boom while carrying the cut tree based at least in part on the measured orientation of the boom.

In another aspect, the disclosure provides a controlled lean system for a tree feller-buncher. The system includes a boom coupled to the tree feller-buncher, the tree feller-buncher having an undercarriage, a felling head operably connected to the boom, and a sensor coupled to the felling head, the sensor operable to measure an orientation of the felling head with respect to the undercarriage. A controller is in operable communication with the sensor, the controller being operable to detect a cut tree carried by the felling head and to estimate a quantity of tree lean needed to reduce torsional load during rotation of the boom while carrying the cut tree based at least in part on the measured orientation of the felling head.

In another aspect, the disclosure provides a method of controlling a lean of a cut tree carried by a tree feller-buncher. The method includes measuring with a sensor an orientation of a boom coupled to the tree feller-buncher, wherein a felling head is operably connected to the boom, detecting with a controller in operable communication with the sensor a cut tree carried by the felling head, and estimating with the controller in operable communication with the sensor a quantity of tree lean needed to reduce torsional load during rotation of the boom while carrying the cut tree based at least in part on the measured orientation of the boom.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

The term calculating (or calculate and calculated), as used herein, is used with reference to calculations performed by the disclosed system. The term includes calculating, determining, and estimating. Also, various embodiments of the systems and methods herein are disclosed as being applied on or used in conjunction with tree feller-bunchers. As used herein an in the appended claims, the term "feller-buncher" encompasses tree fellers, feller-bunchers, harvesters, and any similar machine or device adapted to move or transport cut trees. In some embodiments, the systems and methods disclosed herein are particularly well-suited for application on or use in conjunction with equipment having one or more blades used to cut trees.

Figure 1:
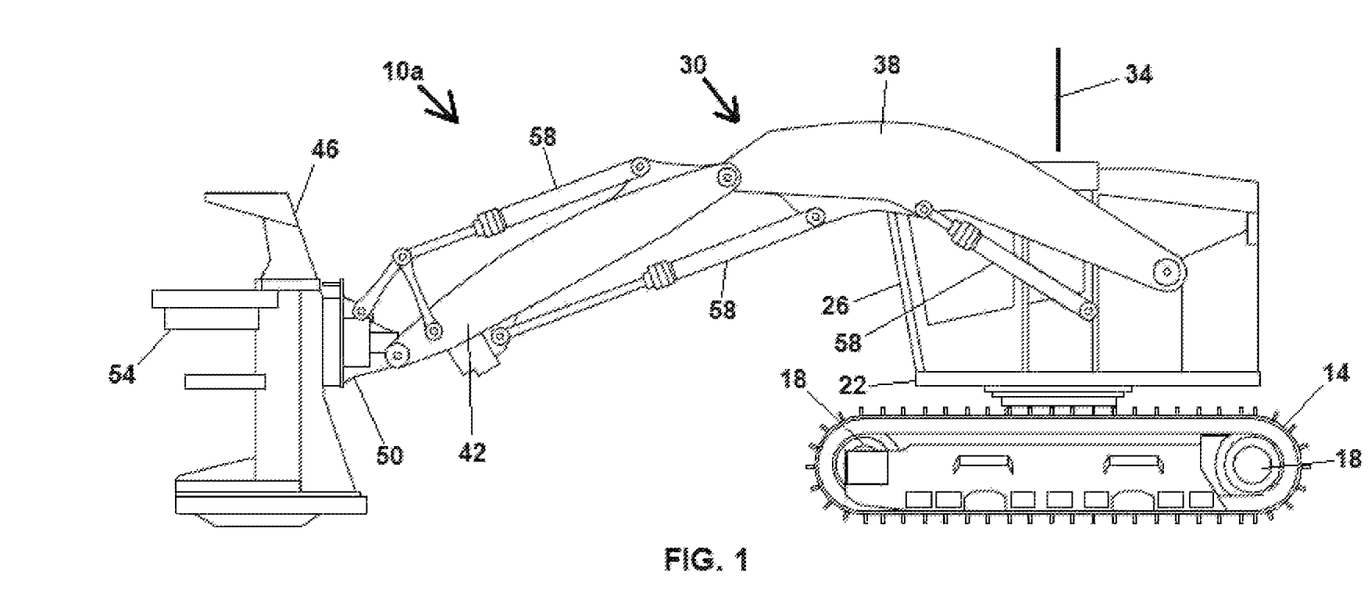
FIG. 1 is a side view of a non-leveling tracked tree feller-buncher.

FIG. 1 illustrates an embodiment of a non-leveling tree feller-buncher 10*a*. The tree feller-buncher 10*a* includes a plurality of tracks 14 that are connected to an undercarriage or frame 20 (shown in FIG. 3). Each track 14 includes drive wheels 18 that rotate with respect to an axle (not shown) carried by the undercarriage 20 to rotate the track 14. The undercarriage 20 is attached to a turntable 22 presenting a face that carries a cab 26 and a boom 30. The turntable 22 rotates about a first axis 34, allowing the turntable 22 (and attached cab 26 and boom 30) to rotate with respect to, and independent of, the undercarriage 20 and attached tracks 14. As shown in FIG. 1, the axis 34 is approximately perpendicular to the face of the turntable 22. However, in other constructions the axis 34 may be positioned at any suitable orientation to the turntable 22 and/or to one or more other components of the tree feller-buncher 10*a* to facilitate rotation of the turntable 22 with respect to the undercarriage 20 (and the tracks 14). The turntable 22 rotates about the axis 34 three hundred and sixty degrees (360°). However, in other constructions the turntable 22 can rotate about the axis 34 less than three hundred and sixty degrees (360°). The cab 26 houses controls and an operator for operation of the tree feller-buncher 10*a*.

The boom 30 is pivotably connected to the turntable 22 and includes a plurality of sub-booms that define an articulated arm. In the illustrated embodiment of FIG. 1, the boom 30 includes a main boom or first boom 38 coupled to the turntable 22. A stick boom or second boom 42 is pivotably connected to the main boom 38. The stick boom 42 is also pivotably connected to a felling head 46 by a wrist adapter 50. The wrist adapter 50 facilitates both pivotable movement and rotational movement of the felling head 46 (e.g., about a horizontal axis and about a vertical axis with reference to the orientation of the wrist adapter 50 shown in FIG. 1, respectively) in relation to the stick boom 42. The felling head 46 includes a plurality of arms 54 that pivot with respect to the felling head 46 to grab, retain, and release one or more trees during the felling and bunching process. A plurality of hydraulic cylinders 58 are positioned between the turntable 22 and the main boom 38, between the main boom 38 and the stick boom 42, and between the stick boom 42 and the wrist adapter 50. The hydraulic cylinders 58 are operable to move the respective main boom 38, stick boom 42, and wrist adapter 50. Additional hydraulic connections (not shown) facilitate movement of the felling head 54.

The tree feller-buncher 10*a* is non-leveling in that the orientation of the turntable 22 is dependent on the orientation of the undercarriage 20 (shown in FIG. 3) and the tracks 14. Stated another way, the turntable 22 cannot be repositioned independent of the undercarriage 20 and the tracks 14, other than rotating with respect to the turntable as discussed above. Accordingly, the orientation of the turntable 22 (along with the attached cab 26 and the boom 30) is influenced by the ground or terrain encountered by the tracks 14.

Figure 2:
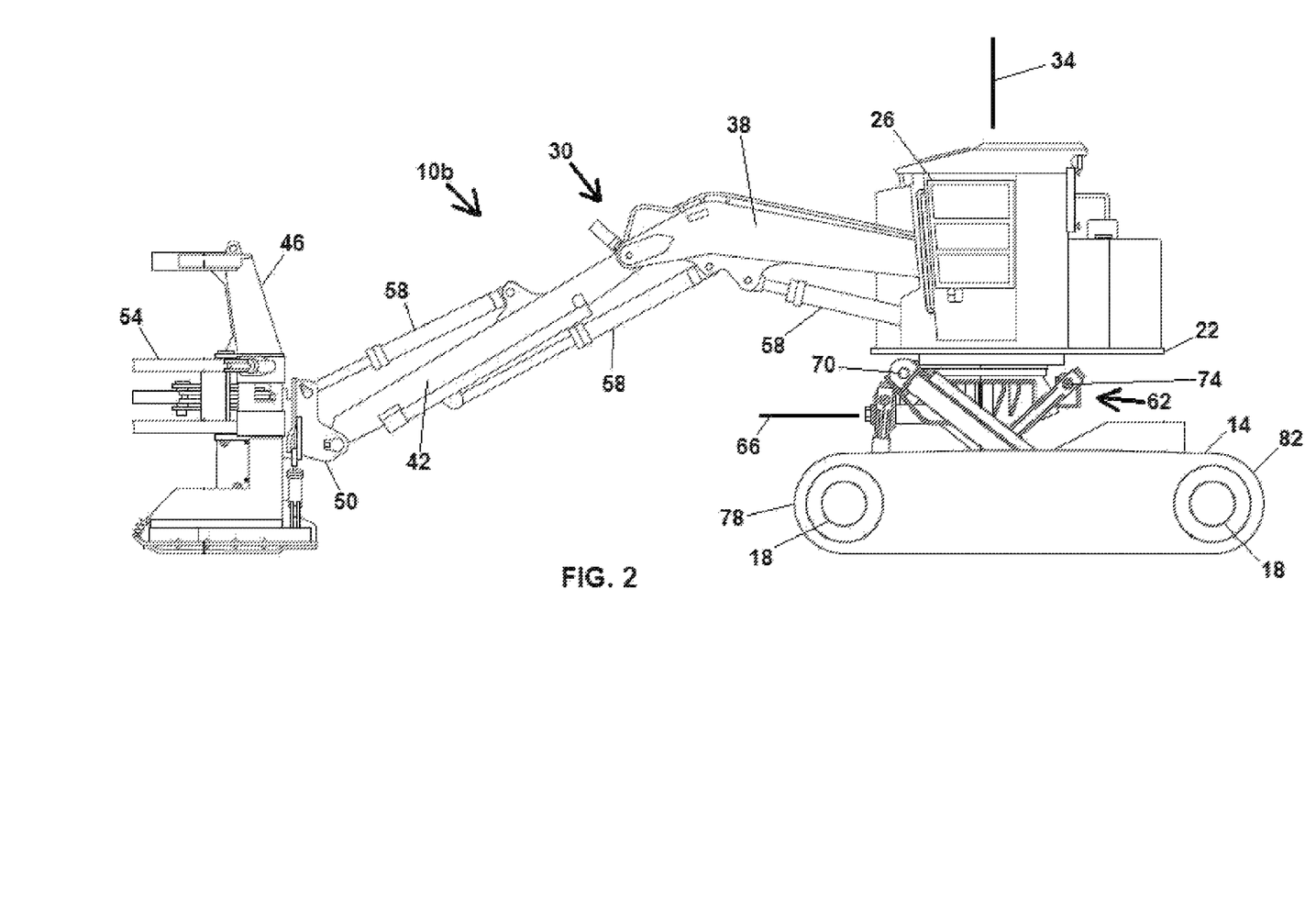
FIG. 2 is a side view of a leveling tracked tree feller-buncher.

FIG. 2 illustrates an embodiment of a leveling tree feller-buncher 10*b*. The leveling tree feller-buncher 10*b* is substantially the same as the non-leveling tree feller-buncher 10*a* discussed above and shown in FIG. 1, with like numbers identifying like components. The leveling tree feller-buncher 10*b* further includes a leveling assembly 62 coupled to the turntable 22 and the undercarriage 20 (shown in FIG. 3). The leveling assembly 62 allows the operator to reposition the turntable 22 (along with the attached cab 26 and the boom 30) independently of the orientation of the undercarriage 20 and the tracks 14. Accordingly, the orientation of the turntable 22 (along with the attached cab 26 and the boom 30) is not necessarily influenced by the ground or terrain encountered by the tracks 14. The leveling assembly 62 allows for movement of the turntable 22 along the first axis 34 (moving the turntable 22 towards or away from the leveling assembly 62). In addition or alternatively, the leveling assembly 62 can pivot side-to-side about a second axis 66 (moving the turntable 22 towards or away from each track 14). Further, in some embodiments the leveling assembly 62 can independently pivot about a third axis 70 and/or about a fourth axis 74. In some embodiments, the third and fourth axes 70, 74 are approximately perpendicular to the second axis 66. The third and fourth axes 70, 74 can facilitate angled positioning of the turntable 22 towards or away from a first end 78 of the track 14 (i.e., a "front" of the tree feller-buncher 10*b* as illustrated in the orientation of FIG. 2) or towards or away from a second end 82 of the track 14 (i.e., a "rear" of the tree feller-buncher 10*b* as illustrated in the orientation of FIG. 2). While FIGS. 1-2 illustrate embodiments of a tracked tree feller-buncher 10, in other embodiments, the system disclosed herein can be used in association with a wheeled or non-tracked tree feller-buncher type vehicle.

Figure 3:
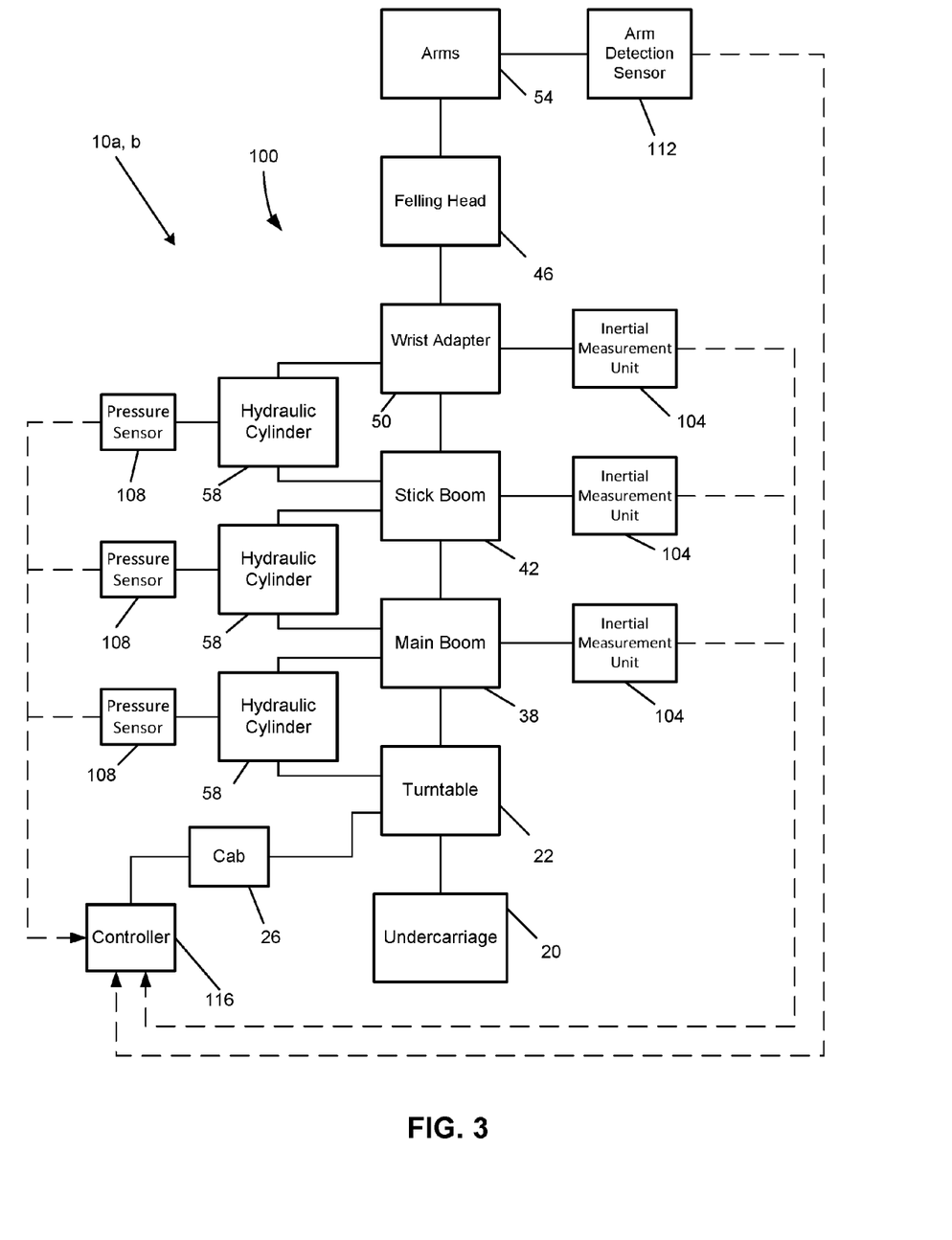
FIG. 3 is a schematic layout of the tree feller-bunchers of FIGS. 1 and 2 illustrating sensor positioning for reducing torsional load on the tree feller-bunchers.

FIG. 3 illustrates a schematic view of an embodiment of a sensor arrangement 100 for the tree feller-bunchers 10*a*, 10*b* described above and illustrated in FIGS. 1 and 2. The sensor arrangement 100 provides sensor data that is utilized by a controlled lean system 200 to reduce a torsional load on the boom 30 and the felling head 46. More specifically, the controlled lean system 200 utilizes the sensor data to rotate the cut tree carried by the felling head 46 in a direction of boom 30 rotation (or swing) to reduce the torsional load during boom rotation.

Referring to FIG. 3, a plurality of inertial measurement units 104 are positioned at locations on the tree feller-buncher 10*a*, 10*b*. Each inertial measurement unit 104 detects changes in the position and/or orientation of the attached component. More specifically, each inertial measurement unit 104 detects changes in (or measures the position and/or orientation of) the attached component along three axes: an X-axis or roll, a Y-axis or yaw, and a Z-axis or pitch. The inertial measurement unit 104 can have a sensor (such as a gyroscope or an accelerometer) associated with each axis that is being measured. Each inertial measurement unit 104 can provide sensor data associated with the position of the attached component along the three measured axes with reference to a reference position or orientation. The reference position or orientation can include a vertical orientation, another orientation skewed with respect to a vertical orientation, or a preset location of the component being measured.

In the embodiment illustrated in FIG. 3, a separate inertial measurement unit 104 is connected to the main boom 38, the stick boom 42, and the wrist adapter 50. In other embodiments, additional or fewer inertial measurement units 104 can be included. For example, in another embodiment an additional inertial measurement unit 104 can be connected to the felling head 46. Each inertial measurement unit 104 tracks the position of the connected component during operation of the tree feller-buncher 10*a*, 10*b*.

Also with reference to the illustrated embodiment of FIG. 3, a plurality of pressure sensors 108 are also positioned at locations on the tree feller-buncher 10*a*, 10*b*. More specifically, a pressure sensor 108 is connected to one or more (or all) of the hydraulic cylinders 58 associated with the boom 30. The pressure sensors 108 detect when a load is applied to the boom 30 (i.e., when the felling head 46 grasps a cut tree). In other embodiments, any number of pressure sensors 108 may be positioned on the tree feller-buncher 10*a*, 10*b* to detect application of a load to the boom 30 (e.g., one pressure sensor 108 or two or more pressure sensors 108).

With continued reference to the illustrated embodiment of FIG. 3, an arm detection sensor 112 is positioned on the felling head 46 to detect the position of each arm 54. The arm detection sensor 112 can be a pressure sensor, optical sensor, or any other suitable sensor suitable for detecting one or more positions of an arm 54. Based on the position of one or more arms 54, the diameter of the tree in the arm is calculated. Based on the species of tree, the combination of tree diameter and tree weight can be used to calculate a tree height. Accordingly, based on the calculated tree diameter and calculated tree weight, a tree height can also be calculated.

Each of the sensors 104, 108, 112 is in communication with a computer processing system or controller 116. The communication can be wired, wireless, or any suitable system for communication (e.g., radio, cellular, BLUETOOTH, etc.). The controller 116 is in communication with the cab 26 through an operator interface (not shown) to provide information relating to the sensors 104, 108, 112 to the operator.

Figure 4:
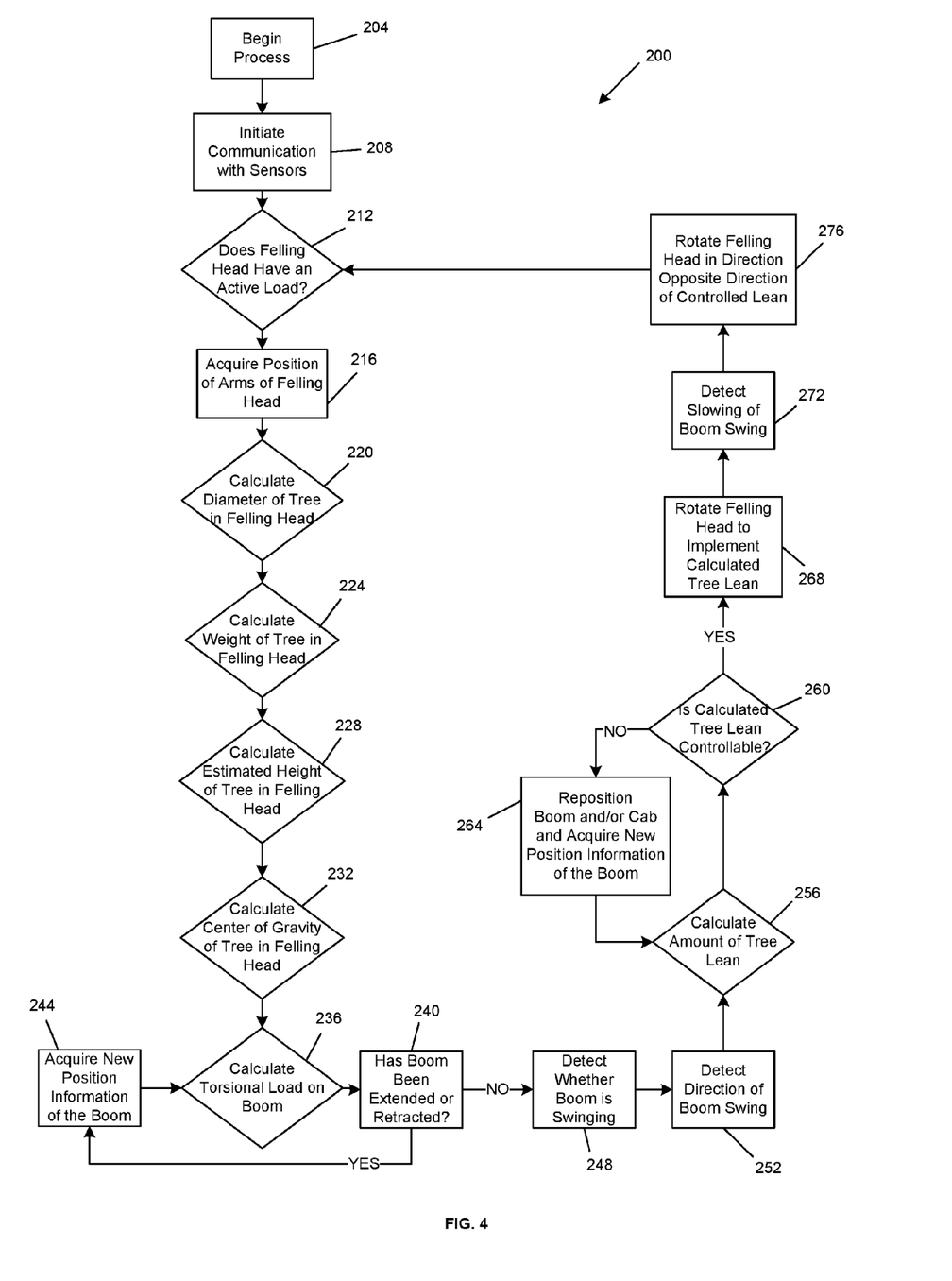
FIG. 4 is a flow diagram of an embodiment of a controlled lean system for reducing torsional load on the tree feller-bunchers of FIGS. 1 and 2 during operation.

FIG. 4 illustrates an example of a controlled lean system or application 200 that uses information acquired from the sensors 104, 108, 112 to initiate a controlled lean of a cut tree in a direction of boom rotation (or swing) to reduce torsional load during boom 30 rotation. After the felling head 46 completes cutting of the tree, the tree is carried by the arms 54 of the felling head 46. The felling head 46 carrying the just-cut tree has a high moment of inertia. Rotation or swinging of the boom 30 incurs a high torsional load to overcome the moment of inertia. The high torsional load can lead to damage of the felling head 46, boom 30, or other components of the tree feller-buncher 10a, 10b. To reduce the torsional load, the application 200 rotates or leans the tree ("tree lean") in a direction of rotation or swing of the boom 30. As the boom 30 slows to complete the rotation or swing, the application 200 rotates or leans the tree in the opposite direction of boom rotation or swing. By using momentum from the tree through a controlled tree lean, the torsional load on the boom 30 and the felling head 46 is reduced during rotation or swinging of the boom 30. This in turn generally reduces the risk of structural failure caused by forces needed to overcome the high moment of inertia after tree cutting, allowing for use of a lighter weight felling head 46. Use of a lighter weight felling head 46 advantageously reduces the total weight of the tree feller-buncher 10a, 10b (as less counterweight is needed).

The application 200 can be a module that operates on (or is associated with) the controller 116 (shown in FIG. 3). The application 200 may be distributed and stored on the controller 116, and/or can be accessible for execution from a remote location, such as through a web portal, website, or generally over the Internet. The controlled lean system or application 200 includes a series of processing instructions or steps that are depicted in flow diagram form in FIG. 4.

Referring to FIG. 4, the process begins at step 204, where the tree feller-buncher 10a, 10b is powered on and in an operational state. The application 200 is initiated, for example, by an interlock with the tree feller-buncher 10a, 10b such that when the tree feller-buncher 10a, 10b is in an operational state, the application 200 is also operational. Next, at step 208 the process initiates communication with each of the sensors 104, 108, 112.

At step 212, a determination is made whether the felling head 46 has an active load (i.e., whether the felling head 46 is carrying a cut or felled tree). To detect whether the felling head 46 has an active load, the process can detect a change in weight of the boom 30 by receiving data from the one or more pressure sensors 108 associated with the hydraulic cylinders 58, and then analyzing that data with reference to a set point, which is the data emitted by the pressure sensor 108 when the boom 30 does not have a load (i.e., an unloaded, steady state pressure sensor 108 output). The set point can be a preprogrammed or preset reading from the pressure sensor 108. Optionally or additionally, the process can detect whether the arms 54 of the felling head 46 have been repositioned, rotated, or provide an increase in pressure indicative of engagement with a tree through the arm detection sensor 112, and/or whether a saw connected to the felling head 46 has cycled to cut the tree. If the process does not detect an active load, the process repeats step 212 until an active load is detected. If the process does detect an active load, the process proceeds to step 216.

Next, at step 216, the controller 116 acquires the position of the arms 54 of the felling head 46 from the arm detection sensor 112. To acquire the arm position of each arm 54 with respect to the felling head 46, the controller 116 can determine, detect, or estimate a position of the arms 54 by pressure data emitted from the arm detection sensor 112, an actual arm 54 position detected in relation to the felling head 46 (i.e., data indicative of rotation of the arms 54 with respect to the felling head 46, optical data, and the like), or any other data suitable to detect the position of the arms 54. At step 220, the a diameter of the tree in the felling head 46 is calculated. To calculate the diameter of the tree in the felling head 46, the arm detection sensor 112 can provide measured data indicating a position of the arms 54. Based on the arm 54 position data, the process calculates an estimated tree diameter (as in some embodiments the process can include preprogrammed distances between the arms 54 based on the position data of each arm 54). Once the tree diameter has been calculated, the process proceeds to step 224.

At step 224, the weight of the tree in the felling head 46 is calculated. To calculate the tree weight in the felling head 46, the process receives data from the one or more pressure sensors 108 associated with the hydraulic cylinders 58. The process also acquires the position information of the boom 30 from one or more of the associated inertial measurement units 104 (e.g., the X, Y, and Z positions of the main boom 38, the stick boom 42, the felling head 46, the wrist adapter 50, etc.). The process uses the data from the pressure sensors 108 and the position information of the boom 30 to calculate an estimated load weight of the boom 30 and the tree. This calculated load weight is then compared against a preprogrammed or preset weight of the boom 30. The difference results in a calculated weight of the tree in the felling head 46. In other embodiments, the weight of the tree can be calculated directly by one or more pressure sensors (not shown) on the felling head 46 or boom 30, or any other elements or structure on the feller head 46 or boom 30 used to measure weight.

Next, at step 228, an estimated height of the tree in the felling head 46 is calculated. To calculate the tree height in the felling head 46 The process utilizes the calculated diameter and the calculated weight of the tree to calculate an estimated height, and in some cases takes into account the tree species in this calculation. The tree species can be preprogrammed or preselected by the operator prior to or during operation of the tree feller-buncher 10a, 10b. The tree height calculation can be, for example, through one or more calculations customized by tree species, by a preprogrammed lookup table that provides estimated tree heights based on diameter and weight, or in other manners.

Proceeding to step 232, the process utilizes the calculated diameter, calculated weight, and calculated height of the tree to calculate a center of gravity (or center of mass or an estimated center of gravity) of the tree in the felling head 46. With the center of gravity of the tree thus calculated, the process proceeds to step 236.

At step 236, a torsional load (or moment of inertia) on the boom 30 is calculated based on the calculated weight of the tree, calculated height of the tree, calculated center of gravity of the tree, and/or calculated position of the boom 30. It should be appreciated that the calculated torsional load (or moment of inertia) can be on the boom 30, on one or more components of the boom 30, and/or on one or more components of the tree feller-buncher 10*a*, 10*b*.

Next, at step 240, the system detects whether the boom 30 (and/or the felling head 46) has been repositioned. For example, the system can detect whether the operator extended or retracted the boom 30 (i.e., whether the felling head 46 and cut tree is repositioned further away from the turntable 22 or closer to the turntable 22). The position of the felling head 46 carrying the cut tree in relation to the turntable 22 can influence the torsional load on the felling head 46 and the boom 30 (with the torsional load being greater the further the boom 30 is extended away from the turntable 22). If the operator extends or retracts the boom 30, the process acquires the new position information of the boom 30 (and/or the felling head 46) from one or more of the associated inertial measurement units 104 at step 244, and then returns to step 236 to use the new position data to recalculate an estimated torsional load (or moment of inertia). If the boom 30 has not been repositioned (e.g., extended or retracted), the process proceeds to step 248.

At step 248, the system detects whether the boom begins to swing (or is swinging, collectively referred to as "boom swing"). For example, the detection can be based at least in part on control joystick position or other commands by the operator indicating rotation or swinging of the boom 30. Alternatively or in addition, boom swing can be detected by one or more of the inertial measurement units 104. Once a boom rotation or boom swing is detected (or command is detected), the process proceeds to detect a direction of boom rotation or boom swing at step 252.

Next at step 256, an amount of rotation or lean of the tree ("tree lean") is calculated. To calculate an amount of tree lean to reduce a torsional load (or moment of inertia) by a predetermined amount (or predetermined value), the system can use the calculated center of gravity of the tree, the calculated weight of the tree, the calculated boom position, and/or the calculated torsional load (or moment of inertia). For example, the system can calculate the quantity of controlled lean to reduce the torsional load (or moment of inertia) by a predetermined value, which can be more than 1%, and more specifically more than 5%, and more specifically more than 10%, and more specifically more than 20%.

At step 260, an amount of controlled lean of the tree (or controllable tree lean) to adequately reduce the torsional load (or moment of inertia) is calculated. This quantity can be a quantity of tree lean that can be "controlled" or is "controllable" by the feller 10*a*, 10*b* (i.e., the amount of lean of the tree is inside or outside a predetermined tolerance that can be deemed controllable). The process then determines whether the calculated tree lean (from step 256) is controllable (e.g., in view of the calculated amount of controllable tree lean). If the process determines that the calculated quantity of lean necessary cannot be controlled or "no," the process can require the boom 30 to be retracted, extended, or otherwise moved (e.g., via boom retraction, boom extension, cab rotation, and the like). The process then proceeds to step 264, where the boom 30 is repositioned (e.g., retracted, extended, etc.), and/or where the cab 26 is repositioned (e.g., rotated, tilted, etc.). The repositioning of the boom 30, cab 26, or any other suitable component(s) of the tree feller-buncher 10*a*, 10*b* can be performed automatically and/or by the operator following instructions or other notice to the operator to take such repositioning actions. The process acquires the new position information of the boom 30 from one or more of the associated inertial measurement units 104. After the new position information of the boom 30 is acquired, the process returns to step 256 to recalculate the amount of rotation or lean of the tree necessary based on the new boom position. If at step 260 the system determines that the quantity of lean necessary can be controlled or is controllable or "yes," the process proceeds to step 268.

At step 268 the felling head 46 is automatically rotated with respect to the boom 30 (and more specifically with respect to the wrist adapter 50) the calculated amount of lean of the tree (or tree lean) to facilitate a controlled lean of the tree suitable to reduce the torsional load (or to overcome an inertial force) on the boom 30. The calculated quantity can be a few degrees or a percentage of rotation of the felling head 46, for example between zero degrees (0°) and five degrees (5°), and more specifically between zero degrees (0°) and ten degrees (10°), and more specifically between zero degrees (0°) and twenty-five degrees (25°), and more specifically between zero degrees (0°) and 90 degrees (90°), and specifically more than zero degrees (0°), and more specifically between negative 90 degrees (−90°) and positive 90 degrees (+90°) to provide one hundred and eighty degrees (180°) of rotational adjustment. As another example, the percentage of rotation of the felling head 46 can be between zero percent (0%) and fifty percent (50%), and more specifically less than fifty percent (50%), and more specifically greater than zero percent (0%). However, in other embodiments the felling head 46 can rotate any suitable number of degrees (or percentage of rotation) with respect to the boom 30 (and/or with respect to the wrist adapted 50) to facilitate a controlled lean of the tree suitable to reduce the torsional load (or to overcome an inertial force) on the boom 30 (or one or more components of the boom 30, and/or on one or more components of the tree feller-buncher 10*a*, 10*b*). The rotation of the tree is in the direction of the detected swing or rotation of the boom 30. Stated another way, an end of the tree opposite or extended away from the felling head 46 will be positioned towards the direction of the detected swing or rotation of the boom 30. Once rotation of the felling head 46 is complete (and the lean has been executed), the process allows for rotation or swing of the boom 30 (i.e., rotation of the turntable 22 carrying the boom 30 about the axis 34, as shown in FIGS. 1-2). It should be appreciated that the controlled lean of the tree can reduce the torsional load (or to overcome an inertial force) on the boom 30, one or more components of the boom 30, and/or one or more components of the tree feller-buncher 10*a*, 10*b*.

At step 272, the system detects whether the boom swing of the boom 30 is slowing (or has decelerated or the operator begins to slow down or end the rotation or swing of the boom 30). For example, the detection can be based at least in part upon control joystick position or other commands by the operator indicating movement in a direction opposite the direction of rotation or swinging of the boom 30 (i.e., to slow the rotation). Once the process detects that the rotation or swing of the boom 30 is slowing or ending, the process proceeds to step 276, where the felling head 46 is again rotated with respect to the boom 30, and more specifically with respect to the wrist adapter 50, in a direction opposite the direction of the controlled lean of the tree. By rotating the tree out of the controlled lean, the process uses the mass of the tree to further slow or reduce the momentum of the rotation or swing of the boom 30 or decelerate the boom 30. In effect, the process rotates the felling head 46 to its starting position (at step 212) as the boom 30 slows. When the boom comes to a stop, the process returns to step 212.

In various constructions, the process can also include a control strategy where the process learns or anticipates the amount of controlled lean necessary during rotation or swinging of the boom 30. For example, after an operator rotates or swings the boom 30 while carrying a tree having a similar size (e.g., similar length, width, height, and center of gravity), and the rotation or swing is a similar distance (i.e., indicating felling of trees in a stand or other finite location, and rotating the cut trees to be placed on a pile at another finite location), the process can remember the quantity of controlled lean and swing or rotation distance of the boom 30 (detected by each inertial measurement unit 104 to calculate the position of each monitored component).

Various features and advantages of the disclosure are set forth in the following claims.

What is claimed is:

1. A controlled lean system for a tree feller-buncher, the system comprising:
    a first sensor configured to measure an orientation of a boom coupled to the tree feller-buncher;
    a felling head operably connected to the boom; and
    a controller operable to detect a cut tree carried by the felling head and to estimate a quantity of tree lean based at least in part on the measured orientation of the boom, wherein the controller is further operable to control rotation of the felling head with respect to the boom in a first direction to implement the estimated quantity of tree lean, wherein the controller is operable to detect deceleration of rotation of the boom and is operable to control rotation of the felling head with respect to the boom in a second direction, opposite the first direction, to further decelerate rotation of the boom.

2. The controlled lean system of claim 1, wherein the quantity of tree lean is between zero degrees and five degrees.

3. The controlled lean system of claim 1, wherein the boom includes a wrist adapter operably connected to the felling head, wherein the controller is operable to control rotation of the felling head with respect to the wrist adapter.

4. The controlled lean system of claim 1, wherein the controller is operable to estimate a quantity of tree lean necessary to reduce a torsional load on the boom by a predetermined value.

5. The controlled lean system of claim 1, further comprising:
    an arm position detection sensor operably coupled to a plurality of arms connected to the felling head and operable to engage the cut tree, the controller operable to estimate a diameter of the cut tree engaged in the plurality of arms based on the measured arm position of the felling head.

6. The controlled lean system of claim 1, further comprising:
    at least one hydraulic cylinder operably connected to the boom; and
    a pressure sensor configured to measure a pressure within at least one hydraulic cylinder,
    wherein the controller is operable to detect the cut tree in the felling head and estimate a weight of the cut tree in the felling head based on the measured pressure.

7. The controlled lean system of claim 1, further comprising:
    an arm position detection sensor configured to measure a position of a plurality of arms coupled to the felling head, the plurality of arms configured to engage a cut tree,
    wherein the controller is operable to estimate a diameter of the cut tree engaged in the plurality of arms based on the measured position of the plurality of arms.

8. The controlled lean system of claim 7, further comprising:
    at least one hydraulic cylinder operably connected to the boom; and
    a pressure sensor configured to measure a pressure within at least one hydraulic cylinder,
    wherein the controller is further operable to detect the cut tree in the felling head and estimate a weight of the cut tree in the felling head based on the measured pressure.

9. The controlled lean system of claim 8, wherein the controller is configured to estimate a height of the cut tree based in part on the calculated diameter of the cut tree and the calculated weight of the cut tree.

10. The controlled lean system of claim 9, wherein the controller is configured to estimate a center of gravity of the cut tree based in part on the calculated diameter of the cut tree, the calculated weight of the cut tree, and the calculated height of the cut tree.

11. A controlled lean system for a tree feller-buncher comprising:
    a boom coupled to the tree feller-buncher, the tree feller-buncher having an undercarriage;
    a felling head operably connected to the boom;
    a sensor coupled to the felling head, the sensor operable to measure an orientation of the felling head with respect to the undercarriage; and
    a controller in communication with the sensor, the controller operable to detect a cut tree carried by the felling head and to estimate a quantity of tree lean needed to reduce a torsional load on the boom by a predetermined value based at least in part on the measured orientation of the felling head with respect to the boom;
    at least one hydraulic cylinder operably connected to the boom; and
    a pressure sensor configured to measure a pressure within the at least one hydraulic cylinder,
    wherein the controller is operable to detect the cut tree in the felling head and estimate a weight of the cut tree in the felling head based on the measured pressure.

12. The controlled lean system of claim 11, wherein the sensor is a first sensor, and further comprising a second sensor coupled to the boom, the second sensor operable to measure an orientation of the boom with respect to one of the undercarriage, wherein the controller is in communication with the second sensor, the controller operable to estimate the quantity of tree lean needed to reduce torsional load on the boom by a predetermined value based at least in part on the measured orientation of the felling head with respect to the boom.

13. The controlled lean system of claim 12, further comprising:
    a stick boom operably connected to the boom and the felling head; and
    a third sensor coupled to the stick boom, the third sensor operable to measure an orientation of the stick boom with respect to the undercarriage and/or with respect to the felling head, wherein the controller is in operable communication with the third sensor, the controller operable to estimate the quantity of tree lean needed to reduce torsional load on the boom by a predetermined value based at least in part on the measured orientation of the stick boom.

14. The controlled lean system of claim 13, wherein the controller is operable to control rotation of the felling head with respect to the boom in a first direction to implement the estimated quantity of tree lean.

15. The controlled lean system of claim 14, wherein the controller is operable to detect deceleration of rotation of the boom and is operable to control rotation of the felling head with respect to the boom in a second direction, opposite the first direction, to decelerate rotation of the boom.

16. The controlled lean system of claim 11, further comprising:
an arm position detection sensor configured to measure a position of a plurality of arms coupled to the felling head, the plurality of arms configured to engage a cut tree, wherein the controller is operable to estimate a diameter of the cut tree engaged in the plurality of arms based on the measured position of the plurality of arms.

17. The controlled lean system of claim 16, wherein the controller is configured to estimate a height of the cut tree based in part on the calculated diameter of the cut tree and the calculated weight of the cut tree, and wherein the controller is further configured to estimate a center of gravity of the cut tree based in part on the calculated diameter of the cut tree, the calculated weight of the cut tree, and the calculated height of the cut tree.

18. A controlled lean system for a tree feller-buncher, the system comprising:
a first sensor configured to measure an orientation of a boom coupled to the tree feller-buncher;
a felling head operably connected to the boom;
a controller operable to detect a cut tree carried by the felling head and to estimate a quantity of tree lean based at least in part on the measured orientation of the boom, wherein the controller is further operable to control rotation of the felling head with respect to the boom in a first direction to implement the estimated quantity of tree lean;
at least one hydraulic cylinder operably connected to the boom; and
a pressure sensor configured to measure a pressure within at least one hydraulic cylinder,
wherein the controller is operable to detect the cut tree in the felling head and estimate a weight of the cut tree in the felling head based on the measured pressure.

19. The controlled lean system of claim 18, wherein the quantity of tree lean is between zero degrees and five degrees.

20. The controlled lean system of claim 18, wherein the boom includes a wrist adapter operably connected to the felling head, wherein the controller is operable to control rotation of the felling head with respect to the wrist adapter.

21. The controlled lean system of claim 18, wherein the controller is operable to estimate a quantity of tree lean necessary to reduce a torsional load on the boom by a predetermined value.

22. The controlled lean system of claim 18, further comprising:
an arm position detection sensor operably coupled to a plurality of arms connected to the felling head and operable to engage the cut tree, the controller operable to estimate a diameter of the cut tree engaged in the plurality of arms based on the measured arm position of the felling head.

23. The controlled lean system of claim 18, further comprising:
an arm position detection sensor configured to measure a position of a plurality of arms coupled to the felling head, the plurality of arms configured to engage a cut tree,
wherein the controller is operable to estimate a diameter of the cut tree engaged in the plurality of arms based on the measured position of the plurality of arms.

24. The controlled lean system of claim 23, wherein the controller is configured to estimate a height of the cut tree based in part on the calculated diameter of the cut tree and the calculated weight of the cut tree.

25. The controlled lean system of claim 24, wherein the controller is configured to estimate a center of gravity of the cut tree based in part on the calculated diameter of the cut tree, the calculated weight of the cut tree, and the calculated height of the cut tree.

* * * * *